2 Sheets--Sheet 1.

D. PIERSON, J. W. MACY & J. D. MOORE.
Corn-Planters.

No. 136,337.  Patented Feb. 25, 1873.

WITNESSES.  INVENTORS.

2 Sheets--Sheet 2.

D. PIERSON, J. W. MACY & J. D. MOORE.

Corn-Planters.

No. 136,337.　　　　　　　　　　Patented Feb. 25, 1873.

WITNESSES.　　　　　　　　　　INVENTORS.

UNITED STATES PATENT OFFICE.

DAVID PIERSON, JASON W. MACY, AND JAMES D. MOORE, OF GRINNELL, IOWA.

IMPROVEMENT IN CORN-PLANTERS.

Specification forming part of Letters Patent No. 136,337, dated February 25, 1873.

*To all whom it may concern:*

Be it known that we, DAVID PIERSON, JASON W. MACY, and JAMES D. MOORE, of Grinnell, in the county of Poweshiek and State of Iowa, have invented a new and valuable Improvement in Corn-Planters; and we do hereby declare that the following is a full, clear, and exact description of the construction and operation of the same, reference being had to the annexed drawing making a part of this specification, and to the letters and figures of reference marked thereon.

Figure 1:
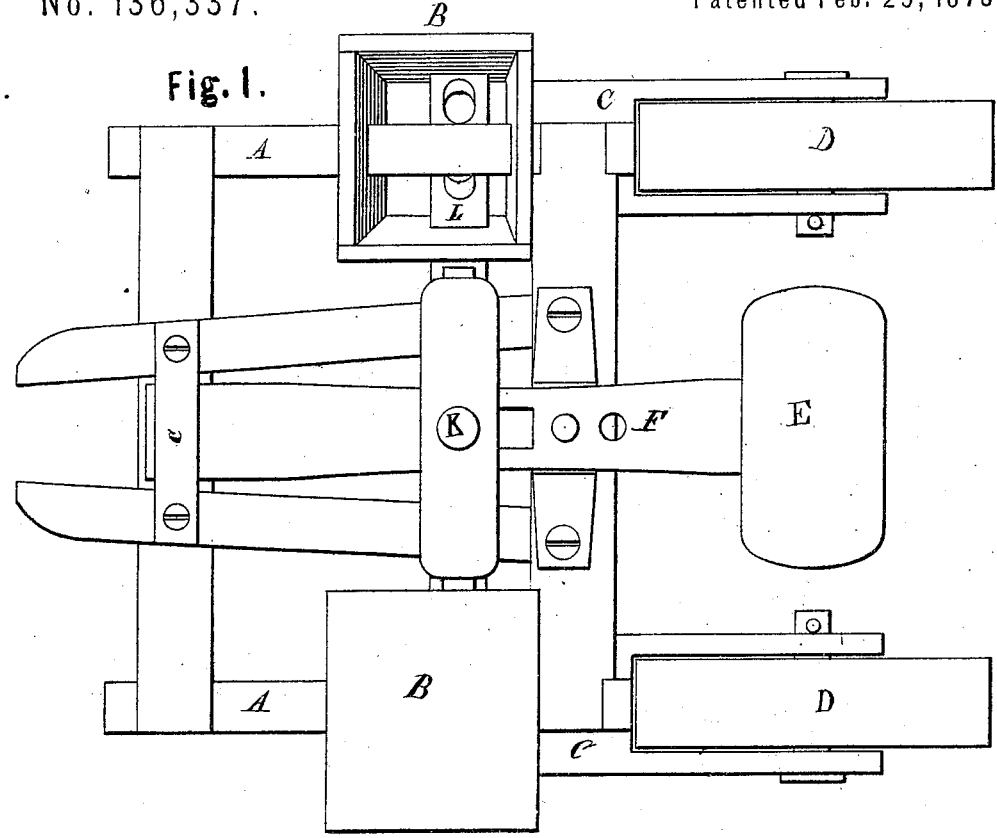
Figure 2:
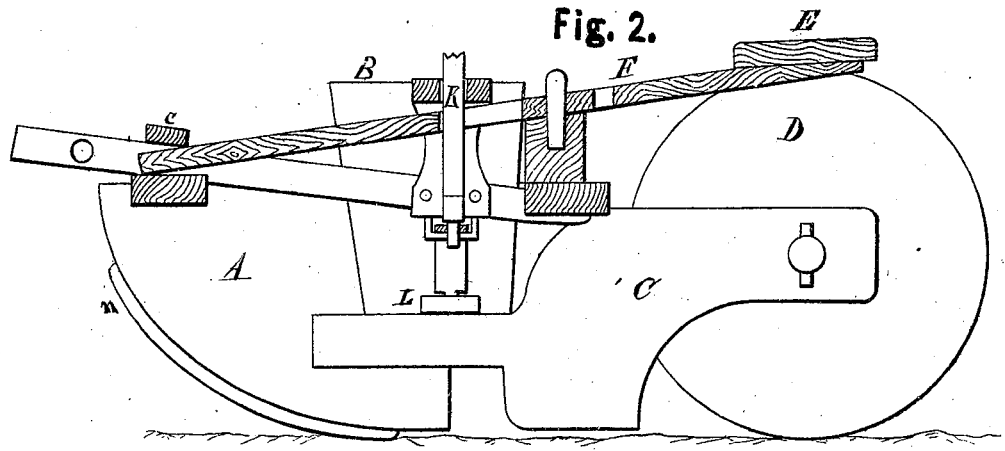
Figure 3:
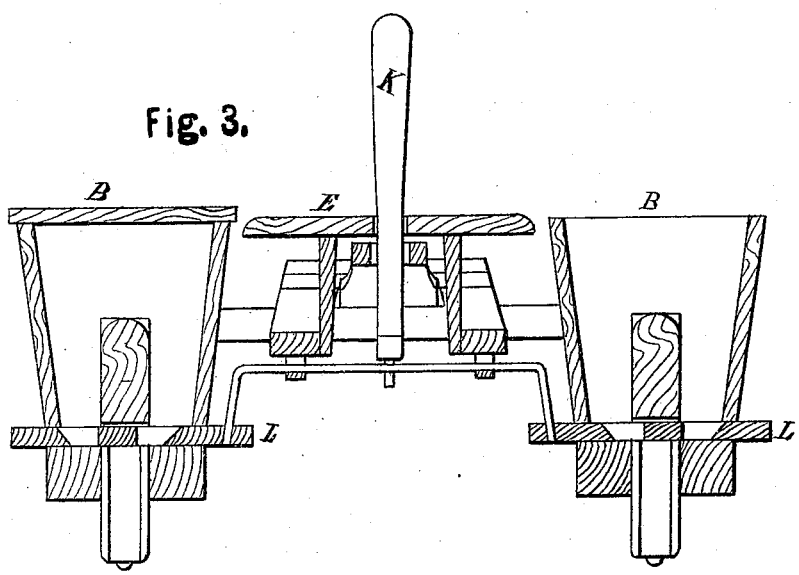
Figure 4:
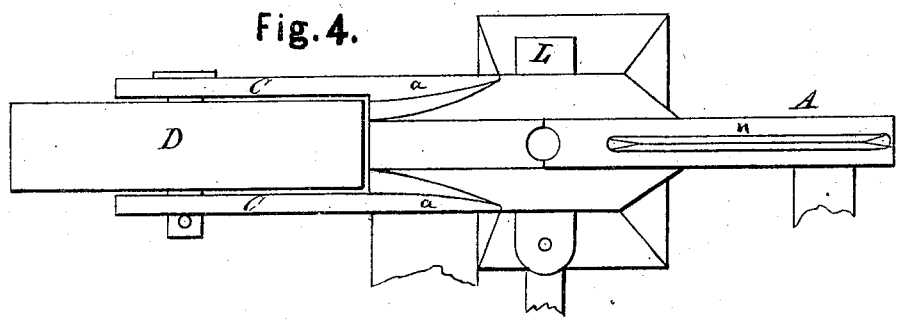

Figure 1 of the drawing is a representation of a plan view of our invention. Fig. 2 is a longitudinal section of our invention. Fig. 3 is a transverse section of our invention. Fig. 4 is a detail view of our invention.

Our invention has relation to corn-planters; and consists in the novel construction of the seed-box, runner, and scraper hereinafter described, whereby a planter of great efficiency is intended to be manufactured at a comparatively small price.

The letters A of the drawing represent the side pieces or runners of our planter. They are, respectively, constructed of a single plank, and arranged to pass through the centers of the seed-boxes B so as to divide the same into two equal compartments, as shown. The letters C represent side bars, firmly attached to the runners A on each side, and serving to form the bottoms of the compartments of the seed-box. The rear ends of the side bars A extend to the rear of the runners, and serve as bearings for the journals of the rollers D. They are also beveled outward, as shown at $a$ on Fig. 4, to serve as scoops to gather the loose earth directly in the path of the rollers.

E represents the driver's seat, made adjustable by pin-holes in the bar F, to which it is attached; said bar being held in position at its front end under the cross-bar $c$, as shown on Figs. 1 and 2. The letter K represents the operating-lever. It is in a vertical position in front of the driver's seat, and is intended to be actuated by hand. L represents the horizontal feeding-bar passing through the bottom of the feed-box. It has two openings, as shown, through which the seeds are passed from the box to the ground; and inasmuch as the box is divided into two compartments, the seed is passed through said openings alternately, first from one compartment and then from the other. The letter $n$ represents a removable shoe attached to the front part of the runner A, and so arranged that it can be easily substituted for another when worn out or injured.

What we claim as our invention, and desire to secure by Letters Patent, is—

In a corn-planter frame, the scrapers C attached to the sides of the runner A, and forming the bottoms of compartments into which the seed-box is divided by said runner, all said parts being constructed and arranged as specified.

In testimony that we claim the above we have hereunto subscribed our names in the presence of two witnesses.

DAVID $\overset{\text{his}}{\times}$ PIERSON.
mark.
JASON W. MACY.
J. D. MOORE.

Witnesses:
CHAS. H. SPENCER,
G. F. H. STEVENS.